(12) United States Patent
Hong (10) Patent No.: US 7,003,766 B1
(45) Date of Patent: Feb. 21, 2006

(54) SUITE OF METRICS FOR SOFTWARE QUALITY ASSURANCE AND PRODUCT DEVELOPMENT

(75) Inventor: Yi Hong, West Keansburg, NJ (US)

(73) Assignee: AT&T Corp., New York, NY (US)

( * ) Notice: Subject to any disclaimer, the term of this patent is extended or adjusted under 35 U.S.C. 154(b) by 681 days.

(21) Appl. No.: 09/884,723

(22) Filed: Jun. 19, 2001

(51) Int. Cl.
G06F 9/45 (2006.01)
(52) U.S. Cl. ........................ 717/144; 717/162; 717/163
(58) Field of Classification Search ................ 717/108, 717/116, 144–147, 101–103, 162–164
See application file for complete search history.

(56) References Cited

U.S. PATENT DOCUMENTS

| | | | |
|---|---|---|---|
| 5,655,074 A * | 8/1997 | Rauscher ...................... | 714/38 |
| 5,729,746 A * | 3/1998 | Leonard ...................... | 717/101 |
| 5,903,453 A * | 5/1999 | Stoddard, II ................. | 700/79 |
| 6,128,773 A * | 10/2000 | Snider .......................... | 717/132 |
| 6,219,805 B1 * | 4/2001 | Jones et al. ................... | 714/38 |
| 6,516,337 B1 * | 2/2003 | Tripp et al. ................. | 709/202 |
| 6,550,053 B1 * | 4/2003 | Muckley ...................... | 717/100 |
| 6,651,244 B1 * | 11/2003 | Smith et al. ................. | 717/154 |
| 6,658,643 B1 * | 12/2003 | Bera .......................... | 717/101 |
| 6,662,357 B1 * | 12/2003 | Bowman-Amuah ......... | 717/120 |
| 6,851,107 B1 * | 2/2005 | Coad et al. ................. | 717/108 |

OTHER PUBLICATIONS

Mueck et al, "A configurable type hierarchy index for OODB", ACM The VLDB Journal, 6:312-332, 1997.*
Lindemann et al, "Performance analysis of time enhanced UML diagram based on stochastic processes", ACM WOSP, pp 25-43, Jul. 24-26, 2002.*
Grao et al, "From UML activity diagram to stochastic petri nets application to software performance engineering", ACM WOSP, pp 25-35, Jan. 14-16, 2004.*
Gao et al, "An object state test model obejct state diagram", ACM Proc of the 1995 Conf. of the Center for Advanced Studies on Collaborative Resh, pp 1-14, 1995.*
Onodera et al, "A study of locking objects with bimodal fields", ACM OOPSLA, pp 223-237, 1999.*
Farwer et al, "Model checking object petri nets in prolog" ACM PPDP, pp. 20-31, 2004.*
Suciu et al, "Any algoriyhm in the complex object algebra with powerset needs exponential space to compute transitivfe closure" ACM SIGMOD, pp 201-209, 1994.*
More, "The nested rectangular array", ACM pp 55-73, 1979.*

* cited by examiner

Primary Examiner—Anil Khatri

(57) ABSTRACT

Based on software developed with use-cases, a suite of metrics for the Product/Process (PP) complexity of software systems as well the PP complexity of each stage in the software development process—analysis, design, and testing—is provided. The metrics suite is important for software quality assurance—Validation and Verification (V&V) as well as for understanding new complexities brought into software development by new technologies. The metrics can be collected based on the two most important documents of use-case software development—scenario diagrams and state diagrams. All metrics are CASE tool computable. Thus, each iterative or incremental development process can be quantitatively measured and compared without incurring extra cost or load on the project team. Efficiency metrics for implementation and test stages, normalization rules and logic-metrics for business tables are also presented. A three-level software visualization approach may have impact on graphical programming or direct transformation.

10 Claims, 10 Drawing Sheets

*Fig. 1*
UNDERLINE: PRIOR ART

*Fig. 2*
UNDERLINE: PRIOR ART

| Field Name | Source: U | Source: L | Comment |
|---|---|---|---|
| r0 | 1 | 5 | |
| r1 | 2 | 6 | |
| r2 | 3 | 7 | If (a>b) then... |
| r3 | 4 | 8 | |
| r4 | 5 | 9 | | resultCode=B; actionText=C;

Table basic semantic statement is:

if
((source=U)&(r0=1)&(r1=2)&(r2=3)&(r3=4)&(r4=5)) {
   resultCode=B; actionText=C;
}
if
((source=L)&(r0=5)&(r1=6)&(r2=7)&(r3=8)&(r4=9)) {
   resultCode=B; actionText=C;
}

Fig. 7

The first 5 cases are: if (ri<>..)..
6 th.: if ((r0=1)&(r1=2)&(r2=3)&(r3=4)&(r4=5))
Path=cyclomatic complexity in this table

Fig. 8

| Field Name | r0 | r1 | r2 | r3 | r4 | ResultCode | actionCode |
|---|---|---|---|---|---|---|---|
| Source: U | 1 | 2 | 3 | 4 | 5 | B | C |
| Source: L | 5 | 6 | 7 | 8 | 9 | B | C |
| Comment |  |  | if a. |  |  |  |  |

Fig. 9

| Result Code | WC action | Source | Mail-address | Action Text |
|---|---|---|---|---|
| G_b_n | Full_S | -U-/L | m1/m2 | "..." |
| G_dup | No Action | -U-/L | m1/m2 | "duplicate" " " |
| G-dup_0 | Fallout | -U-/L | m1/m2 | "duplicate" "Fallout" |
| S_dup | Action Add .. C | -U-/L | m1/m2 | Fallout |
| S_dup_0 | Fallout | -U-/L | m1/m2 | Fallout |

Fig. 10

Case G-b_n: Path=cyclomatic complexity in this table

Fig. 11

| Source | Result-Code | Mail-Address | Action-Text | WC-Action |
|---|---|---|---|---|
| | G-h-n | M11 | "..." | Full-S |
| | G_dup | M12 | "duplicate" | |
| U | G_dup_0 | M13 | | |
| | S_dep | M14 | | |
| | S_dep_0q | M15 | | |
| | G-h-n | M21 | | |
| | G_dup | M22 | | |
| L | G_dup_0 | M23 | | |
| | S_dep | M24 | | |
| | S_dep_0q | M25 | | |

| s1 | s2 | $S_{i+1}$ |
|---|---|---|
| working | working | (no transition) |
| | fallout1 | Fallout |
| | fallout2 | Fallout |
| | succeed | (no transition) |
| fallout | working | Fallout |
| | fallout1 | Fallout |
| | fallout2 | Fallout |
| | succeed | Fallout |
| Succeed | working | (no transition) |
| | fallout1 | Fallout |
| | fallout2 | Fallout |
| | succeed | Succeed |

*Fig. 14*

- ENUMERATE ALL POSSIBLE PATHS — 1410
- REMOVE UNNECESSARY TEST PATHS — 1420
- GENERATE EXPANDED PATH LIST — 1430
- DETERMINE CONDITIONS BETWEEN STATE PAIRS AND CALCULATE RESULTS — 1440

*Fig. 15*

| Data Type | In-Weight |
|---|---|
| Short, long, float, double, char, bool | 0.5 |
| String | 1.0 |
| Enum, union, sequence | 1.5 |
| Any | 4.0 |
| Struct, object, exception | Sum of in-weights of subfields |
| Array, vector, linklist | 1.0 + in-weight of element type |

Fig. 16

I: indicates input to the next stage;
O: indicates output of the stage;
F: indicates feedback to the previous stage.
SRCL: System release confidence level metric, presented in the attachment.

SUITE OF METRICS FOR SOFTWARE QUALITY ASSURANCE AND PRODUCT DEVELOPMENT

FIELD OF THE INVENTION

The present invention relates generally to metrics for determining the complexity of a software system at various stages in the development process including analysis, design and test.

BACKGROUND

A list of desirable properties for software metrics appear in "Object-Oriented Metrics Measures of Complexity", by Brian Henderson-Sellers, Prentice Hall Inc., 1996, chapter 8, the contents of which are herein incorporated by reference. These properties include the following:
1. It is objective and computable in a precise manner.
2. It is consistent, repeatable, and reliable.
3. It provides a useful feedback to allow the user to improve the design.
4. It is amenable to statistical analysis and capable of prediction.
5. It is easy to understand and easy to apply.

But neither the metrics of software complexity nor their collection approach have made significant progress. They have no theoretical bases, are design/implementation dependent, and/or cannot be automatically collected.

The internal process complexity of a software system increases with the number of processes, exceptions, and handlers within it.

Computer Aided Software Engineering (CASE) tools construct diagrams of uses cases to represent the internal process complexity of a software system. Use-cases are described in "Object Oriented Development Process and Metrics", D. Champeaux, Prentice Hall Inc., 1996, chapter 3 ("Champeaux"), the contents of which are herein incorporated by reference. "Use cases embody a simple idea: describe the behavior of a system through examples . . . The notation of a use-case can be generalized from a prototypical interaction sequence to a tree-like format, that covers all possible branches of choices by the use/context and/or by the intended system logic." Champeaux, page 86. A use-case is a piece of functionality in the system that gives a user a result of value. See e.g. Champeaux.

One of the most common documents for software developed with use-case is the scenario diagram. A software system is composed of subsystems; a scenario diagram either describes the interactions between systems and subsystems or the interactions between the internal objects/classes in the subsystems.

Figure 1:
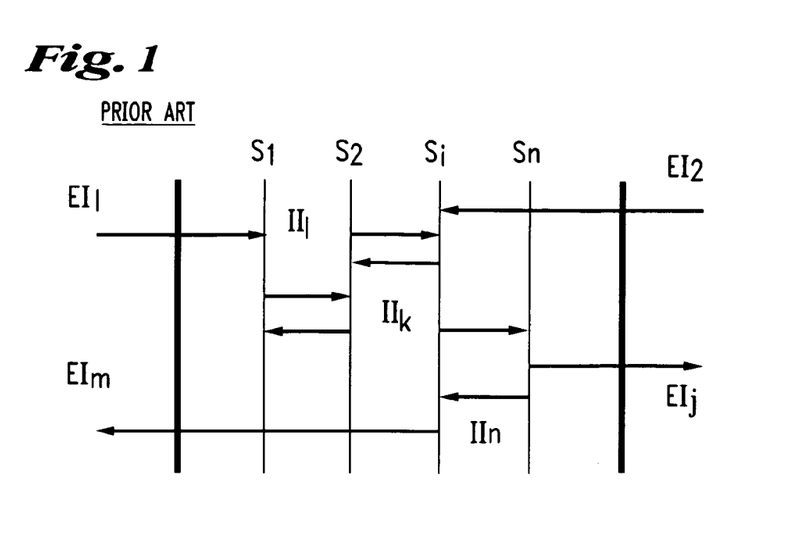
FIG. 1 illustrates the system structure and intra-subsystem message interaction diagram.
Figure 2:
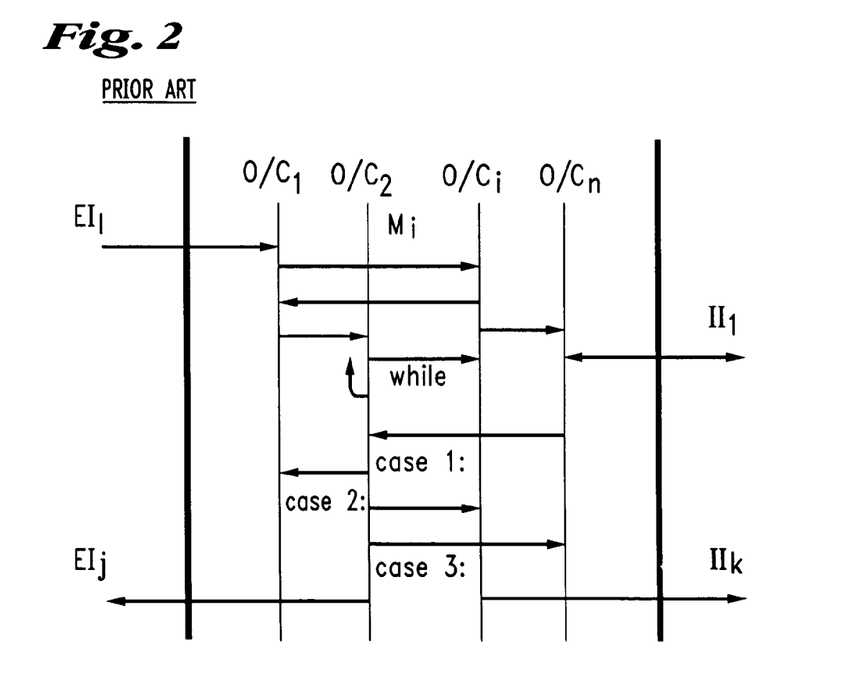
FIG. 2 shows the internal object/class interactions for a subsystem.

FIG. 1 illustrates the system structure and intra-subsystem message interaction diagram where
  $S_i$ is a subsystem i;
  $EI_j$ is an external interaction from/to the external business world;
  $II_k$ is the internal invocation between the two subsystems.
FIG. 2 shows the internal object/class interactions for a subsystem $S_i$ where
  $EI_j$ and $II_k$ are the same as in FIG. 1, and
  $M_i$ is an object/class method call.

Correct, complete, and well-maintained scenario diagrams directly represent system complexity. They represent complications of the system internal logical process, of interfaces between subsystems, and of the interfaces between subsystems and external systems.

Object/class interaction diagrams should present all branches of use-cases. But diagrams generated by current CASE tools do not clearly identify conditional branches. In particular, diagrams generated by current CASE tools fail to show the branches for exception cases and do not clearly present the whole picture of the use-case set or the whole project.

Further, existing CASE tools cannot print all possible state transition paths for a State Transition Diagram and cannot establish the dynamic relations among the states of different levels. Accordingly, there exists a need for a software complexity metric that represents exceptions in addition to normal process scenarios.

SUMMARY OF THE INVENTION

The present invention includes a method for measuring complexity comprising the steps of: creating a graph representation of a set of use-cases; creating a plurality of vertices corresponding to start and/or end points of said use-cases; creating a plurality of edges corresponding to a plurality of said set of use-cases, each of said edges connecting two of said vertices; and determining the complexity from the graph representation. Traditional software metrics only measure the complexity of the implemented software product; the present invention measures the complexity of software-requirements.

The present invention measures complexity of business tables already present in most of software requirement documents. The steps of the method comprise of dividing business table cells into two types—conditional and assignment; arranging these cells according to normalization rules; and determining the complexity from the number of cells of each conditional type.

The present invention further includes a method for measuring complexity of state transition diagrams of multi-level objects The method comprises the steps of: determining a plurality of graphs of object-state transition of K levels $l_k$, $0<k<K$ wherein one or more of said graphs at level $l_{k+1}$ are expansions of one or more of said graphs at level $l_k$; and said graphs comprise a plurality of nodes to represent a corresponding plurality of states of the use-cases and a plurality of edges to represent a corresponding plurality of transitions between the states; and determining the complexity from the plurality of graphs.

The present invention also point out that software complexity should include complexity of both sofware-logic and data input/output.

DETAILED DESCRIPTION OF THE PREFERRED EMBODIMENT

Scenario Branch Diagram

The present invention includes software complexity metrics that represent exceptions in addition to normal process scenarios. These software complexity metrics include an enhanced CASE tool that includes the following features:

Organize scenarios in a Scenario Branch Diagram (SBD) which includes nodes and edges. Each edge represents one use-case scenario diagram or a use-case scenario segment. A scenario segment describes the part of the exception use-case that differs from the normal use-case. The nodes at each end of an edge indicate the start-point and end-point of a scenario.

Add a "Scenario Frame Bar" to the left of the object/class interaction diagram. A scenario frame bar is directional with a start node and an end node, which is indicated by the Scenario Branch Diagram. Along the bar, a node can be inserted to indicate a scenario branching-off or merging-in.

Figure 3:
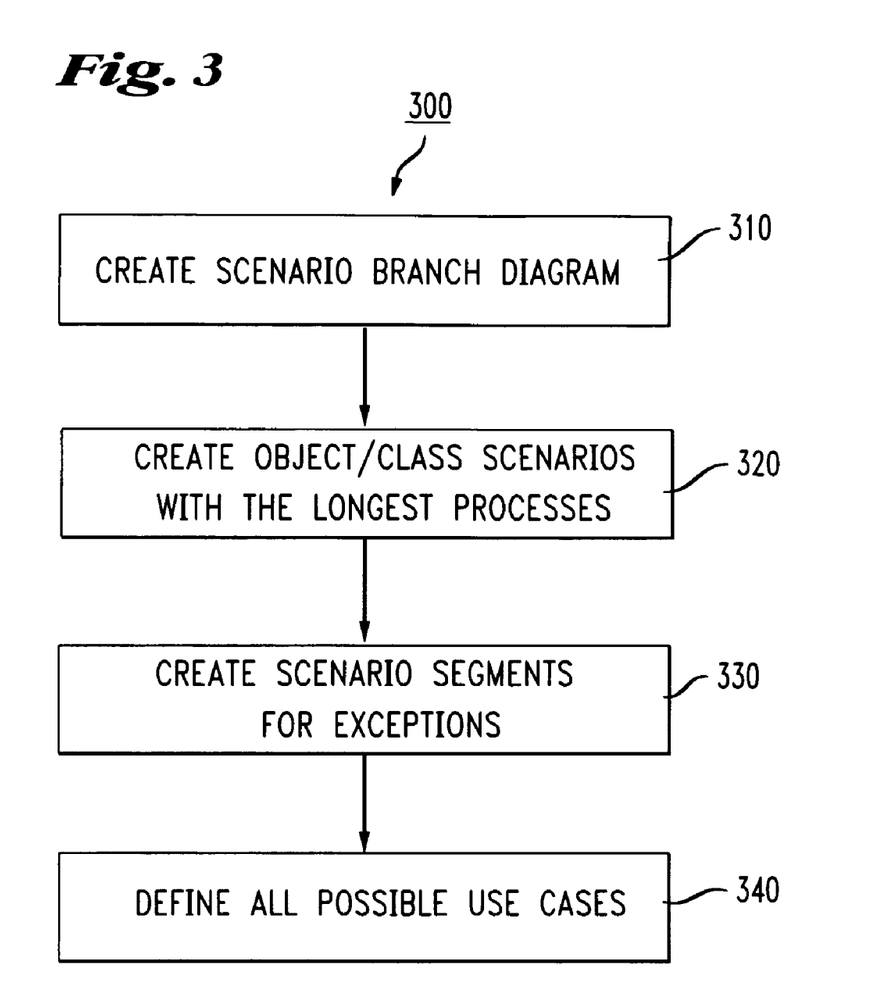
FIG. 3 shows a flow diagram of a method for creating a use-case scenario diagram.
Figure 4:
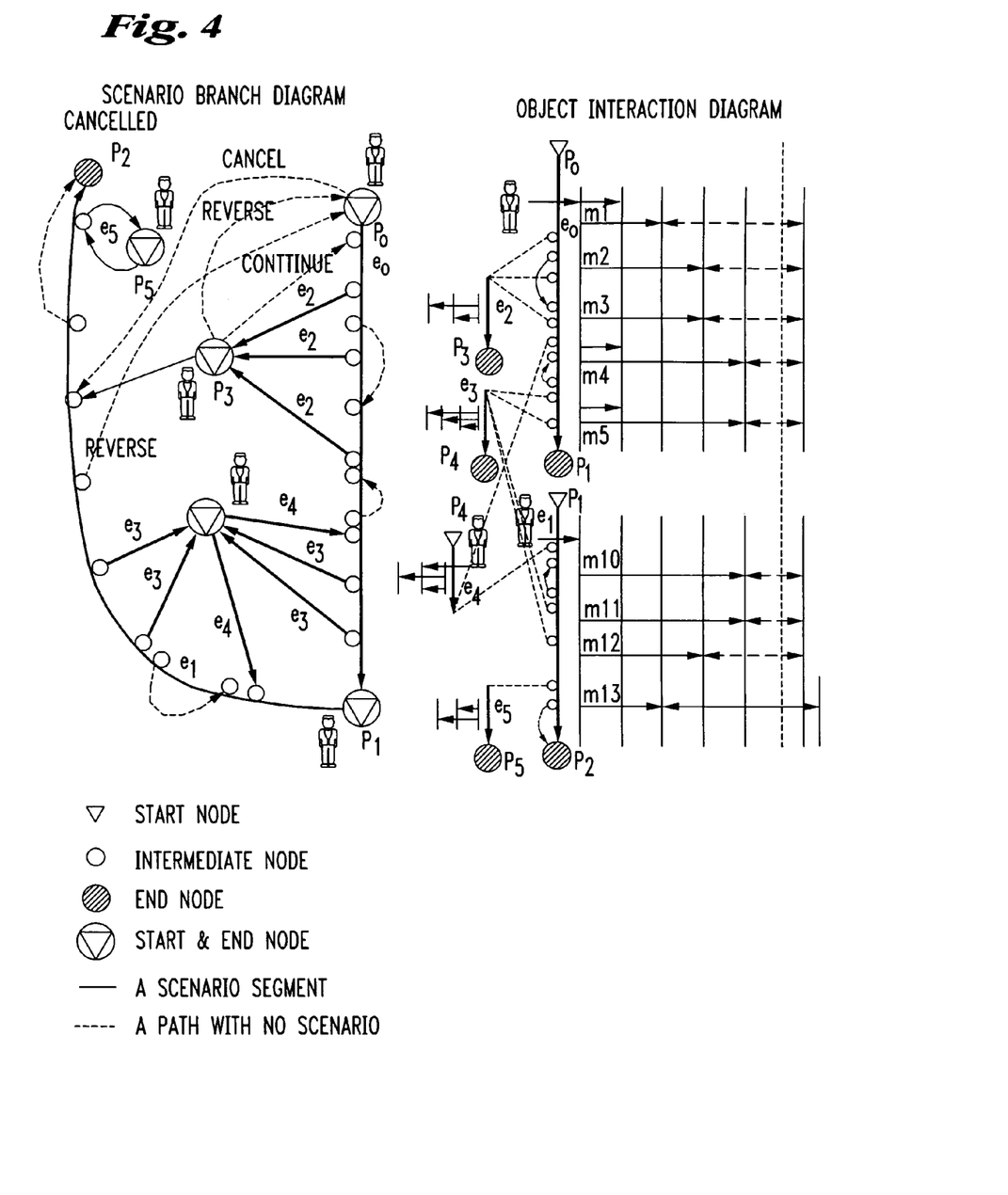
FIG. 4 shows a Scenario Branch Diagram and an Object Interaction Diagram for a use-case set having five start/end nodes.

FIG. 3 shows a flow diagram 300 of a method for creating a use-case scenario diagram. In step 310, a Scenario Branch Diagram (SBD) for a use-case set is created. A use-case set includes the set of use-cases of all forward and/or backward processes as well as related exceptions and handlers of a business procedure. In step 310, all possible start and end nodes for the use-case set are inserted. FIG. 4 shows a Scenario Branch Diagram and an Object Interaction Diagram for a use-case set having five start/end nodes. Node $P_0$ represents pendingProcess; $P_1$ is completeProcess; $P_2$ is processcanceled; $P_3$ is exception1; P4 is exception2; and $P_5$ is exception3.

In step 320, the object/class scenarios with the longest forward and backward processes for one use-case set are created first. Next, the start and end nodes in the SBD are indicated.

For example, in FIG. 4, the forward-process scenario ($e_0$) and the cancelled scenario ($e_1$) are created first. For $e_0$, its start node is $P_0$ and its end node is $P_1$. For $e_1$, its start node is $P_1$ and its end node is $P_2$. Their scenario frame bars are represented as $e_0$ and $e_1$ in the SBD. Next, in step 330, the scenario segments for exceptions based on diagrams for normal scenarios ($e_2$, $e_3$, $e_4$, $e_5$ to the right of FIG. 4.) are created. For each exceptional scenario, the start node and end node in SBD are indicated. Both start and end nodes can be on one of the frame bars in the SBD. In step 330, these exception-scenario edges in the SBD are inserted. The same scenario segment can be inserted in different places ($e_2$, $e_3$, $e_4$ are reused in several locations).

In step 340, all possible use-cases in the SBD are refined. If there is an execution path but no scenario segment between two nodes, the edges are presented in dotted lines. Other edges are presented in solid lines. Along the Frame Bar in the SBD, a loop is indicated with a reverse, dotted arrow.

The CASE tool of the present invention has the ability to print all the use-cases in a use-case set. Along each use-case, it prints the main methods being called and the complexity level of each method as well as the total complexity of the use-case.

A project team uses the CASE tool of the present invention to organize use-cases in a SBD and to keep simple logic in methods. This design strategy helps the software user and the project team to intuitively visualize the business use-cases and to understand the entire system more clearly. Some scenario segments can be reused. Iterative or incremental changes can be made locally. Furthermore, the SBD can measure software logical complexity and benefit automatic programming in the future.

In the preferred embodiment, the SBD Logic Complexity Metric (SBDLCM) is computed as the number of use-case execution paths:

$$SBDLCM_{YPath} = \sum_{i=1}^{m} \sum_{j=1}^{n_1} \prod_{k=1}^{lij} YpathM_{i,j,k} \qquad \text{Equation 1}$$

where m=the number of use-case sets in the SBDs; $n_i$=the number of use-cases in use-case set I; $l_{i,j}$=the number of methods called in the use-case j of use-case set I; and YPathM$_{i,j,k}$ is the number of execution paths in the method M$_{i,j,k}$ to keep the execution in the use-case j of use-case set i.

Figure 5:
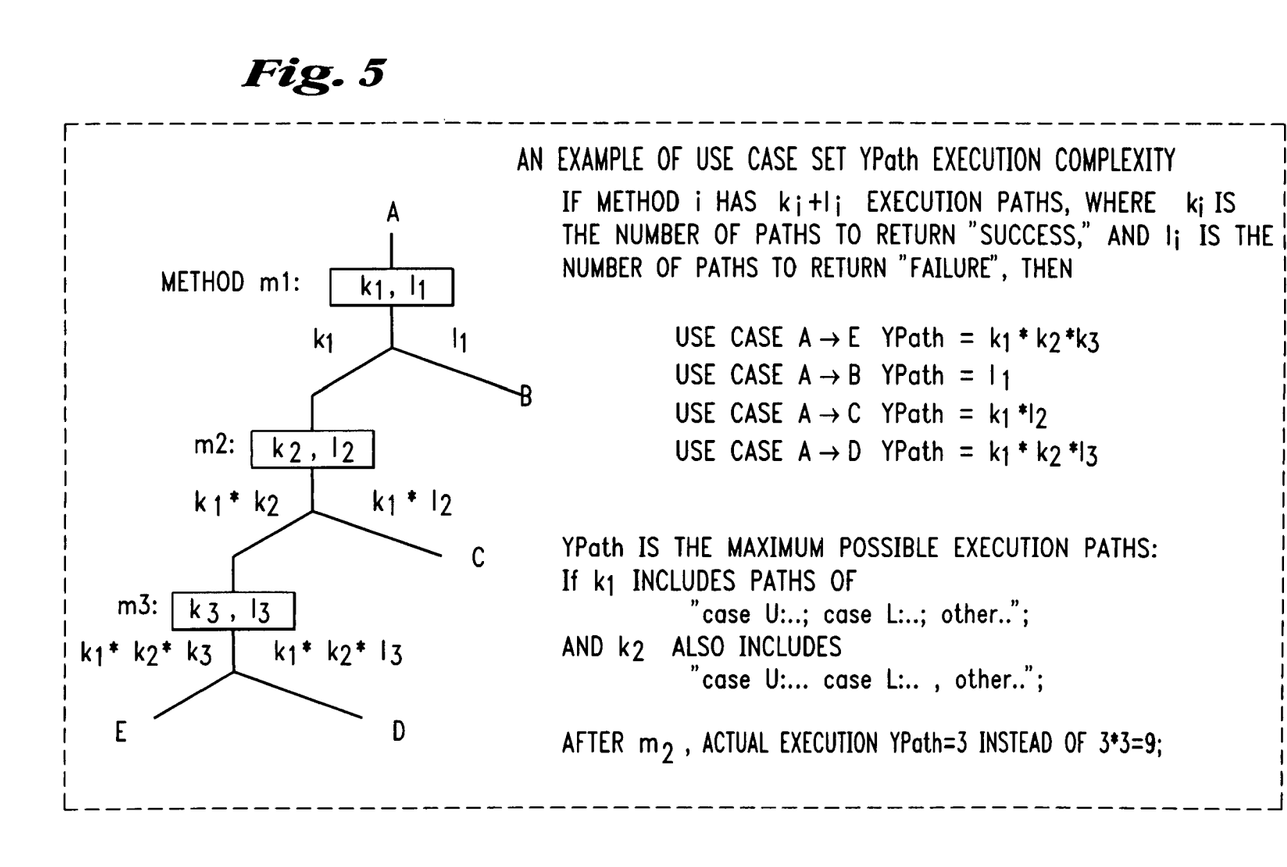
FIG. 5 shows an example of use-case set Ypath execution complexity.

If a method only has one return code, its YPath is the same as Npath as explained in "Npath: A Measure of Execution Path Complexity and Its Applications", IEEE Trans. Soft. Eng. Vol. 31, No. 2, February 1988, pp. 188–200, the contents of which are herein incorporated by reference. Otherwise, YPath is a subset of NPath. FIG. 5 shows an example of use-case set Ypath execution complexity.

In an alternate embodiment, the SBDLCM is computed with the McCabe cyclomatic complexity:

$$SBDLCM_{Mc} = SBDMc_0 + \sum_{i=1}^{m} \sum_{j=1}^{n_i} \sum_{k=1}^{lij} Mc_{i,j,k} \qquad \text{Equation 2}$$

where SBDMc$_0$ is the sum of cyclomatic complexity of all SBDs; m, n, l are defined as in Equation 1; and Mc$_{i,j,k}$ is the cyclomatic complexity of method k in the use-case j of use-case set i. The McCabe cyclomatic complexity is explained further in "Design Complexity Measurement and Testing", T, McCabe and C. Butler, *IEEE Trans. Soft. Eng.*, Vol. 32, No. 12, December 1989, pp. 1415–1425 ("Mc-Cabe"), the contents of which are herein incorporated by reference.

Usually, the logic of entity methods in the analysis model is simple. These entity methods can be developed in a standardized format. The logical statements are limited into "if", "case", "for" and "while" categories. Preferably, the return code is well defined. These conditions enable the CASE tool to compute the YPaths for each method. Preferably, for each edge that branches off a node, the user inputs the YPath before calculating the $SBDLCM_{Ypath}$. Preferably, the CASE tool of the present invention allows the user to input the mutually-exclusive execution paths (in FIG. 2, the combined execution path "case U: . . . " in m1 and "case L: . . . " in m2 is an impossible combination). The metric result would be closer to the correct value after filtering the unreachable execution paths.

When calculating the complexity of the entire system, if a method occurs in more than one use-case, its complexity is counted only in the longest or the most complicated use-case. In the other use-cases, the YPath complexity of the method should be counted as one, while the cyclomatic complexity is counted as zero. This rule avoids over-counting the complexity in Equations 1 and 2. The exceptional use-cases (starting at an exception node, or containing a loop) do not count the paths which end at another exception node.

Business Table Complexity

The present invention determines the number of use-cases from the SBD after it is developed. The present invention also measures the method level logical complexity from the method descriptions on the object/class scenario diagram. Specifically, the present invention includes a method for measuring complexity from requirements that are represented in a Business Rule table. Preferably, these tables are normalized before they are used in complexity calculations. The normalized business rule tables of the present invention measure software requirement complexity and facilitate automatic programming. The present invention includes the following normalization rules for business tables:

a) Divide table cells into if-cells and then-cells. If a cell's value is related to an assignment-statement, it is a then-cell; if its value is related to an if-statement, it is an if-cell.

b) Each then-cell should contain only one value.

c) In the left columns, arrange the if-cells in descending order of their coverage rate or importance. Arrange the then-cells on the right in ascending order of their importance.

d) The adjacent if-cells with identical values should be merged or counted only once.

e) The table should contain only one column-head row. Otherwise, the table needs to be split.

Figure 6:
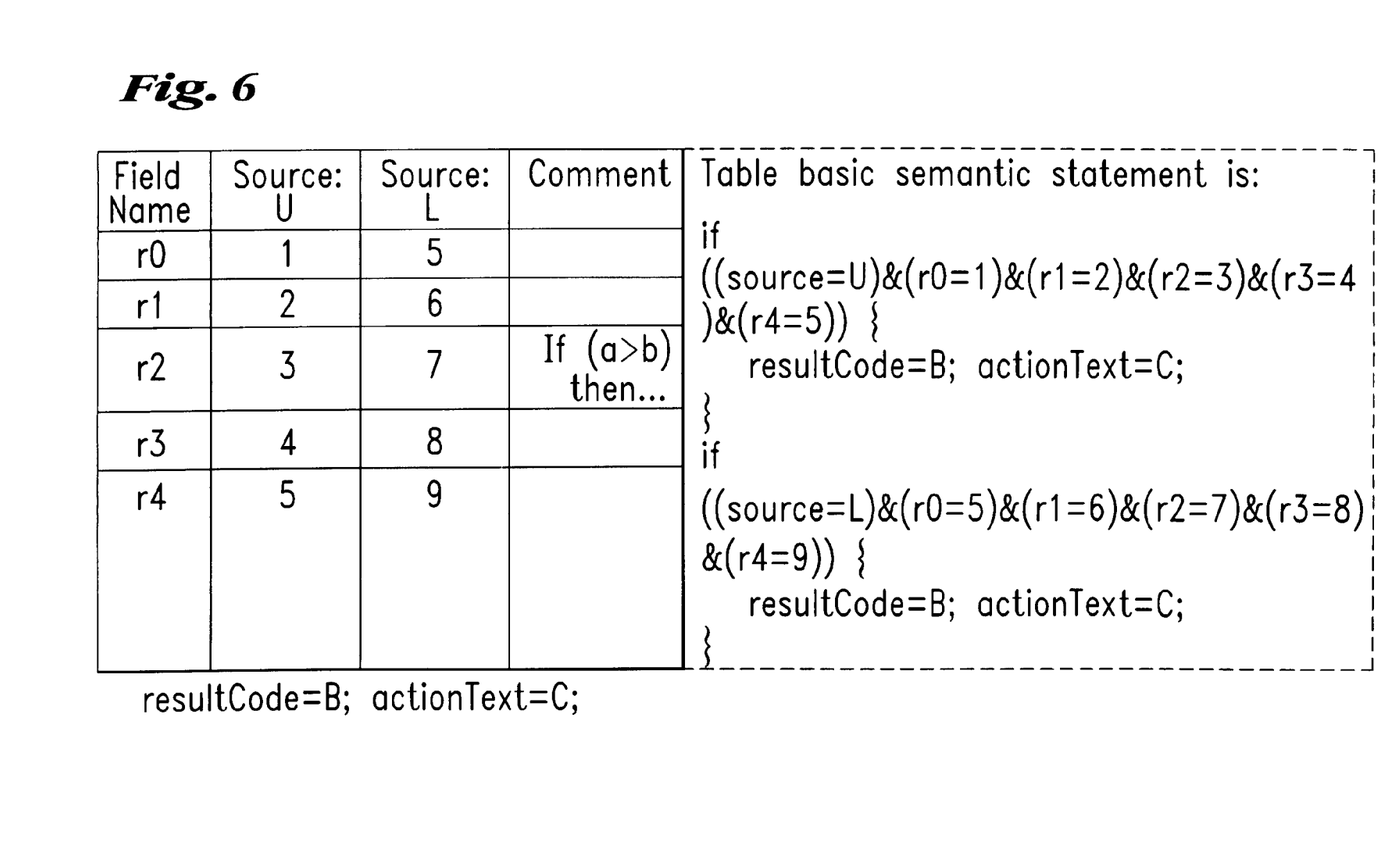
FIG. 6 illustrates a first business table example corresponding to a basic semantic statement.
Figure 7:
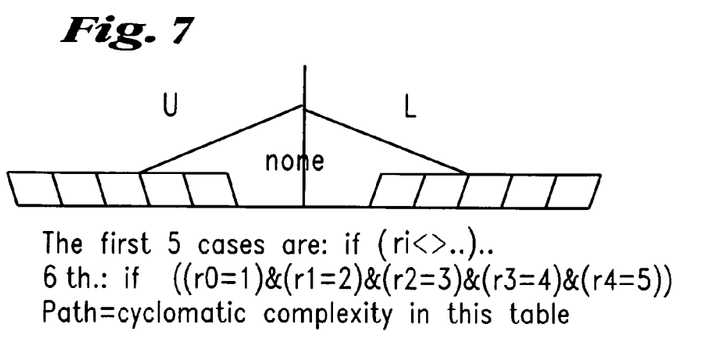
FIG. 7 illustrates the basic logical complexity of the table shown in FIG. 6.
Figure 8:
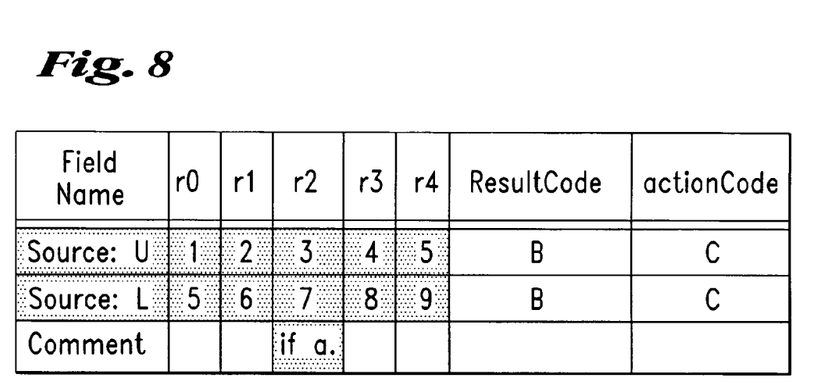
FIG. 8 illustrates the normalized table corresponding to the first business table example shown in FIG. 6.

FIG. 6 illustrates a first business table example corresponding to the following table basic semantic statement:

```
if
((source=U)&(r0=1)&(r1=2)&(r2=3)&(r3=4)&(r4=5)) {
    resultCode=B; actionText=C;
}
if
((source=L)&(r0=5)&(r1=6)&(r2=7)&(r3=8)&(r4=9)) {
    resultCode=B; actionText=C;
}
    resultCode=B; actionText=C;
``` resultCode=B; actionText=C;

FIG. 7 illustrates the basic logical complexity of the table shown in FIG. 6. FIG. 8 illustrates the normalized table corresponding to the first business table example shown in FIG. 6. Normalization rule 1 and normalization rule 3 were applied to the first business table example of FIG. 6 to create the corresponding normalized table of FIG. 8. The if-cells in the normalized business table are shaded.

Figure 9:
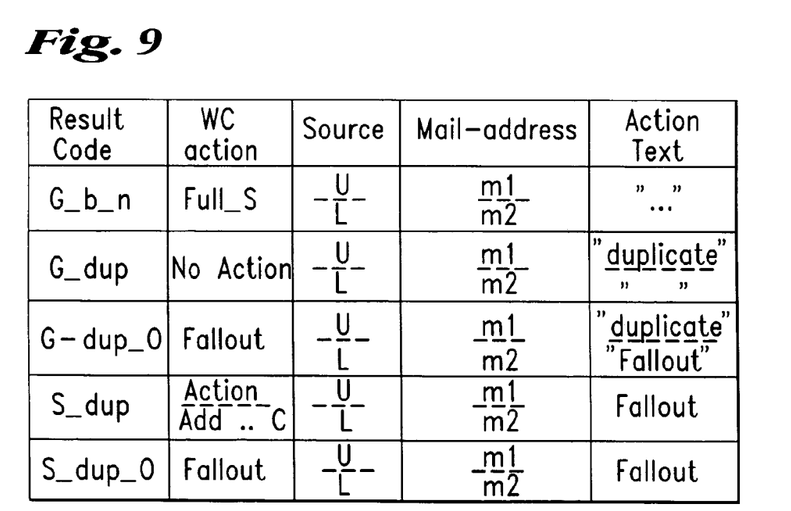
FIG. 9 illustrates a second business table example corresponding to a table basic semantic statement.

FIG. 9 illustrates a second business table example corresponding to the following table basic semantic statement:

```
if (Source=U) switch (ResultCode) {
    case G_b_n:         ........break;
    case G_dup:         ........break;
    case G_dup_O:       ........break;
    case S_dup:         ........break;
    case S_dup_O:       ........break;
    default: break;                  }
else if (Source=L) switch (ResultCode)
{
case G_b_n:             ........break;
    case G_dup:         ........break;
    case G_dup_O:       ........break;
    case S_dup:         ........break;
    case S_dup_O:       ........break;
    default: break;
                                     }
```

Figure 10:
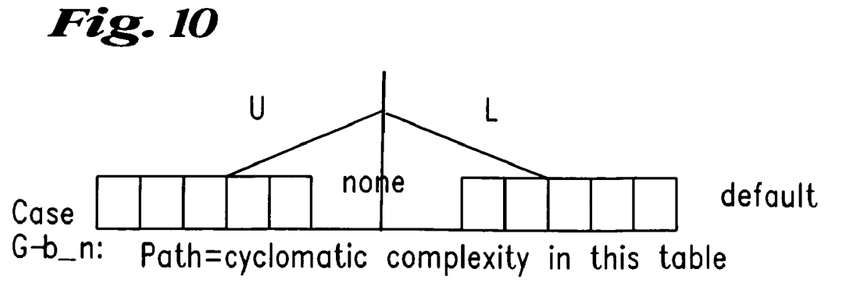
FIG. 10 illustrates the basic logical complexity of the table shown in FIG. 9.
Figure 11:
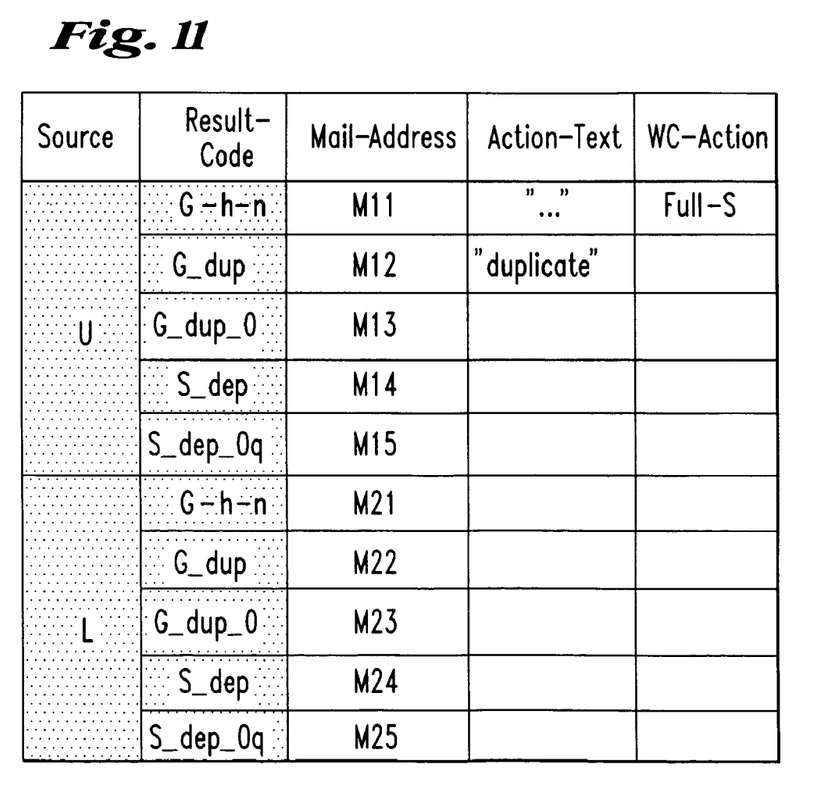
FIG. 11 illustrates the normalized table corresponding to the second business table example shown in FIG. 9.

FIG. 10 illustrates the basic logical complexity of the table shown in FIG. 9. FIG. 11 illustrates the normalized table corresponding to the second business table example shown in FIG. 9. Normalization rules 1, 2, 3 and 4 were applied to the second business table example of FIG. 9 to create the corresponding normalized table of FIG. 11.

Normalized tables are understood more easily by all intended audiences. The logical relation between if-cells in the same row is usually "AND", but "OR" is also possible. The logical relation between different rows is "OR". Preferably, the Business Table Complexity Metric (BTCMI) for these tables is defined as:

$$BTCMI_{MC} = BTCMI_{Path} = \sum_{k=1}^{m} p_k + \sum_{j=1}^{c} (1+p_j) + 1 \qquad \text{Equation 3}$$

where m is the number of if-cells in the main columns of table; c is the number of if-cells in the comment cells; $p_k$ is the number of predicates in an if-cell k in the main columns; and $p_j$ is the number of predicates in an if-cell j in the comments.

For a software system developed using Object Oriented Design, a currently available metric of implementation complexity is the Method Logic Summation Complexity Metric (MLSCM):

$$MLSCM = \sum_{i=1}^{m} \sum_{j=1}^{n_i} Mc_{i,j} = \sum_{i=1}^{m} \sum_{j=1}^{n_i} \left( \left( \sum_{k=1}^{d_{i,j}} P_{i,j,k} \right) + 1 \right) \qquad \text{Equation 4}$$

where m=the number of classes in the Object Oriented project; ni=number methods in class i; Mc is the McCabe cyclomatic metric; $d_{i,j}$=the number of decision statements in method j of class i; $P_{i,j,k}$=the number of predicates in the decision statement k, method j, class i (>=1). See e.g. McCabe. The MLSCM is further explained in "Object-Oriented Software Product Metrics Survey", SPC-97005-MC, Version 01.00,05, February 1998, Chapter 4, the contents of which are herein incorporated by reference.

If $C_P$ is the complexity of coding with respect to the problem, and $A_P$ is the complexity of analyzing the problem, then:

$$\text{Implementation-Efficiency} = A_P/C_P = SBDLCM\text{-}Mc/MLSCM \quad \text{Equation 5}$$

Real code contains extra safety checks that do not show up in the analysis documents. The existence of an object or environmental variable is verified whenever a pointer or reference is obtained. This extra complexity is reflected by $C_P$ but not by $A_P$. The Implementation-Efficiency<1. Values for the Implementation-Efficiency of 0.85~1 may be a reasonable range (15% for safety checks, etc.). Values for the Implementation-Efficiency of 0.1~0.5 indicates a poor implementation approach.

The Scenario Branch Diagram Logic Complexity Metric (SBDLCM) of the present invention has several advantages: a) it is the most objective and precise metric of logical complexity; and b) it measures the complexity of the logic that the software system is required to implement.

Use-case scenario diagrams are widely used as a guide for system analysis, development, and test. The number of use-case branches that have finished analysis, coding, or testing can predict project progress.

SBDLCM-Mc measures software-analysis complexity. Software analysis does not care about the number of execution paths, but instead concentrates on analyzing all possible scenario branches and business processes for each branch. SBDLCM-Mc can also help measure Implementation-Efficiency.

SBDLCM-YPath measures complexity of software analysis, implementation, and test. It helps test-case design. Ideally, it is the best metric to represent the overall software system complexity.

Moreover, as explained in "The Unified Process", I. Jacobson, G. Booch, and J. Rumbaugh, Rational Software, *IEEE Software*, May/June 1999, pages 96102 (the contents of which are herein incorporated by reference), "use cases drive the system architecture and the system architecture influences the selections of the use cases." For example, if one business request can be finished in two use-cases or three use-cases, the total result of this metric is affected by use-case selections. Preferably, this metric is applied in caution that the YPath measurement is accurate and there are consensual use-case selections with the software user.

State Transition Diagram Analysis

Besides SBDLCM, the present invention calculates logical complexity from the State Transition Diagram. This metric, the State Transition Diagram Logical Complexity Metric (STDLCM), is targeted at helping system test.

The general format to describe a use-case is:

use-case-sequence=state, (action, state, system action, state)* with the * indicating one or more repetitions of the bracketed four-tuple. See e.g. Champeaux.

Figure 12:
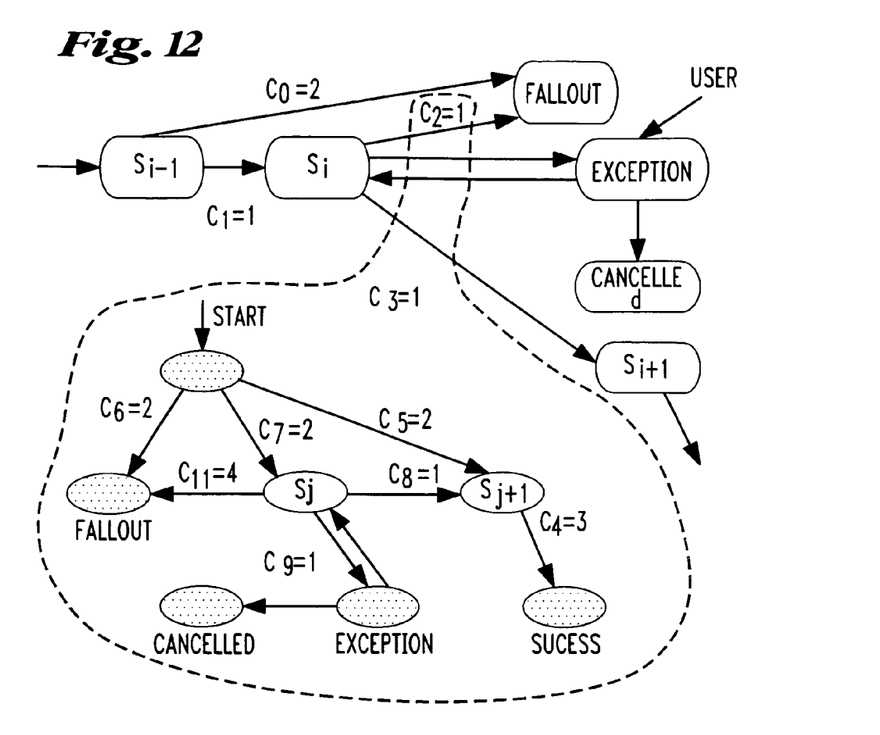
FIG. 12 represents a typical example for nested state transition scenarios.

State transition diagrams in the analysis model clarify which entity objects have the most business-related responsibilities. In the present invention, the entity objects are defined as Business Responsibility Desirable Objects (BRDO). For a large software project, at a certain BRDO's state, there may exist sub-level BRDO state transitions. FIG. 12 represents a typical example for nested state transition scenarios. At state $S_{i-1}$, some conditions bring state to "Fallout", while the normal condition brings state to $S_i$, which indicates that sub-level BRDO(s) is being processed.

If the sub-level process succeeds, it brings super-state to next normal state $S_{i+1}$. If some unsolvable problem happened, it brings super-state to "Fallout". For some exceptional condition, the sub-level BRDO may wait for further user intervention, which brings super-state to "Exception." After intervention, super-state may go to reprocess again or finally go to a "Cancelled" state after sub-level BRDO is in "cancelled" state.

Three relationships may exist between a super-state and a sub-state: (1) If processing transits only from the super-state to the sub-state, the relationship is defined as "in" for both states; (2) if the process transits only from the sub-state back to the super-state, the relationship is defined as "out" for both states; (3) if transitions can occur in both directions, the relationship is defined as "inout" for both states (In one path, process transits in; in another path the process transits out for the same two states). With this definition, all the Expanded State Transition Paths (ESTP) in FIG. 12 can be expressed as $\{(S_{i-1}, S_{i+1})(2)^*, (S_{i-1}, \text{Exception})(1), (S_{i-1}, \text{``Fallout''})(3), (\text{Exception}, S_{i+1})(1), (\text{Exception}, \text{Cancelled})(1)\}$ where $(n)^*$ after each pair of states indicates the number of ESTP(s). Therefore, from the Expanded State Transition Paths (ESTP), the present invention traces the system execution scenarios.

If, concurrently, state $S_i$ has two nested state-transitions, the present invention does not simply expand the state transition paths. Instead, the present invention measures the complexity of transiting from $S_i$ to its next state by enumerating the conditions in business rule tables, as shown in the table in FIG. 13. Then the nested state transition complexity becomes the number of transition-conditions between state $S_i$ and its next state in each path.

Figure 13:
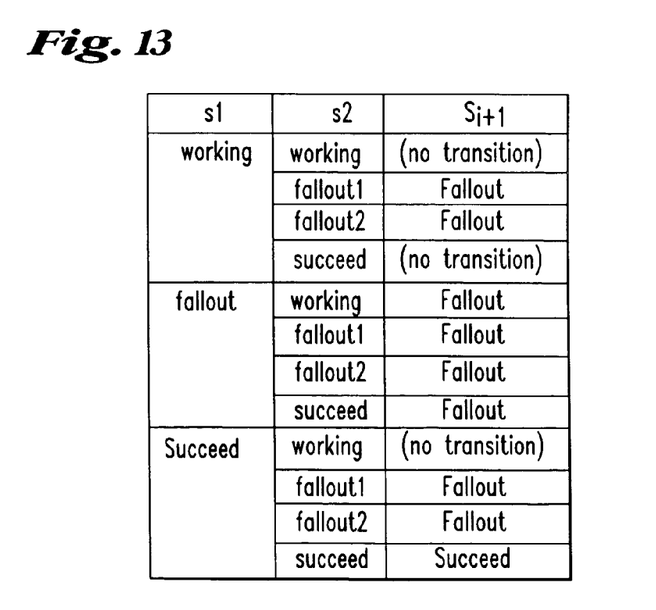
FIG. 13 illustrates an example for two concurrent sub-states (s1 and s2) transitions at state $S_i$.

FIG. 13 illustrates an example for two concurrent sub-states (s1 and s2) transitions at state $S_i$: the number of conditions to bring $S_i$ to "Fallout" is 8; to bring $S_i$ to "Succeed" is 1.

For an arbitrary level-k (k>1) BRDO, if its related upper-level BRDO state is the super-state, and the lower-level BRDO state is the sub-state, the present invention obtains the Status Transition Paths Complexity (STPC) between two super-states by recursively applying Equation 6:

$$STPC_{k,p,q} = \sum_{i=1}^{m_k} \left( \prod_{j=1}^{n_{k,i}} (C_{k,i,j} + (STPC_{k+1,i,j} - sub_{k,i,j})) + mul_{k,i}(N) \right) \quad \text{Equation 6}$$

where $m_k$=the number of transition paths of level-k BRDO (k>1) between two super-states or the number of transition paths of level-1 BRDO; and $n_{k,i}$=the number of states along path i for level-k BRDO. If $S_{k,i,j}$ is the state j in path i of level-k BRDO, $C_{k,i,j}$ is the number of conditions to bring level-k BRDO state from $S_{k,i,j-1}$ to $S_{k,i,j}$; $STPC_{k+1,i,j}$ = Sub-state Transition Complexity between state $S_{k,i,j-1}$ and $S_{k,i,j}$; $sub_{k,i,j}$=0 if $STPC_{k+1,i,j}$=0 and $sub_{k,i,j}$=1 if ($STPC_{k+1,i,j} \neq 0$) (because one condition has been replaced by $STPC_{k+1,i,j}$ it needs to be deducted). If the multiplicity between level-k BRDO and level-(k+1) is 1:N, $mul_{k,i}(N)$=0, if (N=1) and $mul_{k,i}(N)$=r, if (N>1); where r is the number of times that level-(k+1) BRDO transits back to level-k in path i.

The present invention calculates the State Transition Diagram Logical Complexity Metric (STDLCM) through the state transition paths as:

$$STDLCM_{path} = STPC_{1,0,0} \quad \text{Equation 7}$$

where 1 is the first level BRDO of the system.

Preferably, the present invention measures the STDLCM-path based on the state diagrams of design or implementation documents. This approach makes the system test more consistent with the system implementation.

A state-node in a State Transition Diagram can be a start, normal-end, fallout, exception, cancelled, intermediate, or start&end node (a node that acts as the start node for one path and as the normal-end node for another path). In the preferred embodiment, the present invention computes the STDLCM metric using a geometric approach.

Figure 14:
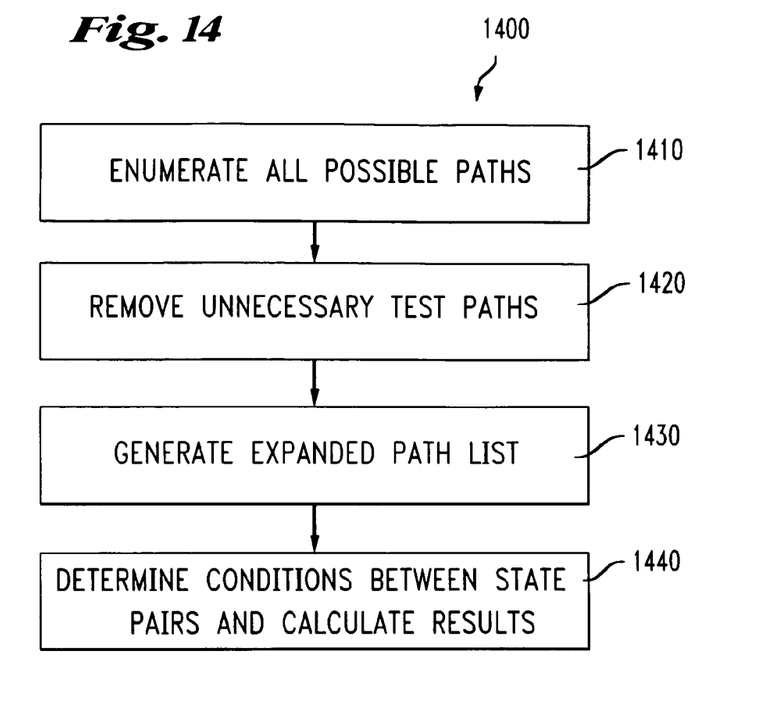
FIG. 14 displays a flow diagram of the method for computing the STDLCM 1400.

FIG. 14 displays a flow diagram of the method for computing the STDLCM 1400. In step 1410, for the state transition diagram of each level BRDO, the method 1400 enumerates all possible paths between all pairs of starting and ending nodes. The starting nodes are start, start&end, and exception. The ending nodes are normal_end, start&end, fallout, cancelled, and exception. If there is a loop in the path, the method 1400 allows only one-repetition and zero-repetition loop paths.

In step 1420, the method for computing the STDLCM 1400 removes the unnecessary test paths (exception→fallout), (exception→exception), (one-repetition-loop→fallout), (one-repetition-loop→cancelled), (one-repletion-loop→exception).

In step 1430, starting with the next-to-lowest level up to the highest-level BRDO, the method 1400 repeatedly generates a new, expanded list of paths by inserting sub-level paths between two consecutive nodes that have pairing sub-nodes {(in, out),(in, inout), (inout,out)}

In step 1440, for each expanded use-case state transition path, the method 1400 multiplies together the number of conditions between each pair of states, and sums the products up to the STPC1,0,0. Usually the more sublevel BRDOs that one BRDO has, the more complicated it would be to synchronize the upper BRDO's state with that of its children.

Between $S_{k,i,j-1}$ and $S_{k,i,j}$, if there is any substate transition, one of $C_{k,i,j}$ will be replaced by $STPC_{k+1,i,j}$. Therefore the present invention deducts one condition ($sub_{k,i,j=1}$ is subtracted) in counting path complexity.

If the number of sublevel BRDOs is N and (N>1), an extra test case is required because there are usually multiple subsystems processing the sub-level BRDOs in parallel. The complexity will be increased by the possible concurrent updates of super-state. Preferably, the present invention adds a version control field in the state table of the upper level BRDO and applies an optimistic-locking mechanism. The extra test case tests whether the final super-state can be set correctly and tests whether the concurrent update can be prevented and the transaction retried successfully ($mul_{k+1,i,j}$ (N)=1 is added). If there is no concurrent processing applied, the present invention pictures it as a For-Loop process existing between states $S_{k,i,j-1}$ and $S_{k,i,j}$. The present invention uses an additional case to test if the final super-state is correct for multiple children.

The number of conditions $C_{k,i,j}$ to bring about a state transition is not a "bargain" number. Instead, the present invention determines this number by the external system/subsystem inputs, which cause the diverse processes between $S_{k,i,j-1}$ and $S_{k,i,j}$. It is the number of significant use-case scenarios or the number of system black-box testing scenarios between the two consecutive states. It includes fewer scenarios than the SBDLCM because it only accounts for the black-box testing scenarios, while it may go beyond the scenarios in the SBDLCM for the extra testing cases of some implementation issues like multi-thread input, concurrent processing complexities or different system configurations.

If $C_{k,i,j}$ is too high, it will bring too much work to the system testers. If it is too low, it will affect system test quality. Accordingly, in the present invention, the whole project team is preferably responsible for determining the proper value of $C_{k,i,j}$.

Among the paths, there is either normal forward processes or backward processes. The present invention counts the longest or the most complicated forward and backward transition paths first. For the other exception-process state-transition-paths, all traversed $C_{k,i,j}$ will be counted once by the present invention. Accordingly, the present invention avoids repeat-counting of the complexity.

State is often used as a communication base for intra-subsystem interaction. If $S_{k,i,j}$ is added under such a case, there is no change in the external inputs between $S_{k,i,j-1}$ and $S_{k,i,j}$, and there are no diverse processes between $S_{k,i,j-1}$ and $S_{k,i,j}$. Thus, the number of conditions to bring about a state transition, $C_{k,i,j}$, should be 1. It won't affect the result of Equation 6, or 7. This shows that the addition of the extra state will not affect the metric result.

The present invention further includes a CASE tool that allows users to specify testing conditions between two consecutive states and the relationship between the super-state and sub-state. Preferably, the present invention prints the number of ESTPS obtained by geometrical approaches (states of each BRDO are represented in different levels), with testing conditions before each state and the complexity level of each ESTP.

The CASE tool of the present invention is superior to existing CASE tools because existing tools cannot print all possible state-transition paths for a State Transition Diagram and cannot well-establish the dynamic relations among the states of BRDOs of different levels.

The State Transition Diagram Logic Complexity Metric (STDLCM) of the present invention has several advantages. It is objective and precise metric. Further, it is not design or implementation dependent. Moreover, states are as defined in the software implementation system based on group efforts that have been through numerous project team review meetings.

STDLCM path is significant for design of system test cases. System-test-case-design and system-test-documents are done by the CASE tool of the present invention with less human effort.

Like the scenario diagrams, the status transition diagrams of the present invention are also widely used as guides for system analysis, implementation, and test. The number of transition paths that have finished analysis, coding, and test predicts project progress.

The STDLCM metric of the present invention measures the complexity of system implementation, integration, and system test. If the state transition diagram is too complicated for implementation, the design is probably too complicated and should be redesigned.

Interface Complexity Analysis

The various interfaces between the internal systems and between internal and external systems also contribute to the overall system complexity. In the preferred embodiment, the present invention measures the interface complexity separately from and differently than the logical complexity.

In recent years, more software systems use a client/server architecture and use multiple-tasks or multiple-threads processing. Furthermore, the growing popularity of Intranet and Internet has increased the demand for distributed computing. The intranet and internet have significantly increased the number of invocations between the subsystems and the complexity of communications. The System Internal Interface Complexity Metric (SIICM) measures the complexity of these communications. IONA Technologies generalized such complexities in their OrbixWeb training materials as explained in "Java and CORBA Building Distributed Applications with OrbixWeb", a3.0.1, IONA Technologies 1994–98, Exception Handling and Raising ("OrbixWeb"), the contents of which are herein incorporated by reference. In particular, "[d]istributed object invocations are more complex to transmit than normal function calls. There will be more error conditions . . . may need more complex structure to carry message passing data fields." Orbix Web.

At present, a project team usually needs specialized and adept developers for configurations of vender's communication software as well as the development, test, and maintenance of interface application software. System External Interface Complexity Metric (SEICM) is also related to data distribution complexity. However, the external business environment has more complicated factors relating to the cognizability, configurability, and stability of each specific business environment. Cognizability involves the ease with which the necessary knowledge and process is analyzed, learned, and manipulated during analysis, implementation, and test. Configurability involves the availability and ease of the resource to be simulated and configured in the development environment during implementation and test. Stability involves the stability of the resource configured in implementation and test environment.

For example, a telephone switching equipment control system is always more complex and unstable than an order/billing system. Its complexity related to the cognizability, configurability, and stability is higher than the order/billing system.

Since SIICM and SEICM are measured in similar ways, the present invention measures these with System Interface Basic Complexity Metric (SIBCM) and System Interface Complexity Weight (SICW). Preferably, the System Interface Basic Complexity Metric (SIBCM) is defined as:

$$SIBCM = \sum_{i=1}^{N_S} \sum_{j=1}^{NM_i} \sum_{k=1}^{NF_{i,j}} WF_{i,j,k}$$ Eqaution 8 where $N_s$=number of subsystems; $NM_i$=number of interface messages of subsystem i=number of call-ins+number of call-backs+number of call-out messages of subsystem i; $NF_{i,j}$=number of fields in the message j in subsystem i; and $WF_{i,j,k}$ is the weight of field k in the message j of subsystem i.

The Object Management Group (OMG), the world's largest consortium of information technology, has defined data types using the Interface Definition Language (IDL) as explained in "Java and CORBA Building Distributed Applications with OrbixWeb", a3.0.1, *IONA Technologies* 1994–1998, "Interface Definition Language", the contents of which are herein incorporated by reference. The data types were defined as follows:

Data transition type: in, out, inout.
Basic data type: short, long, float, double, char, boolean, string;
Complex data type: enum, union, sequence, arrays, struct, object, exception, any.

Figure 15:
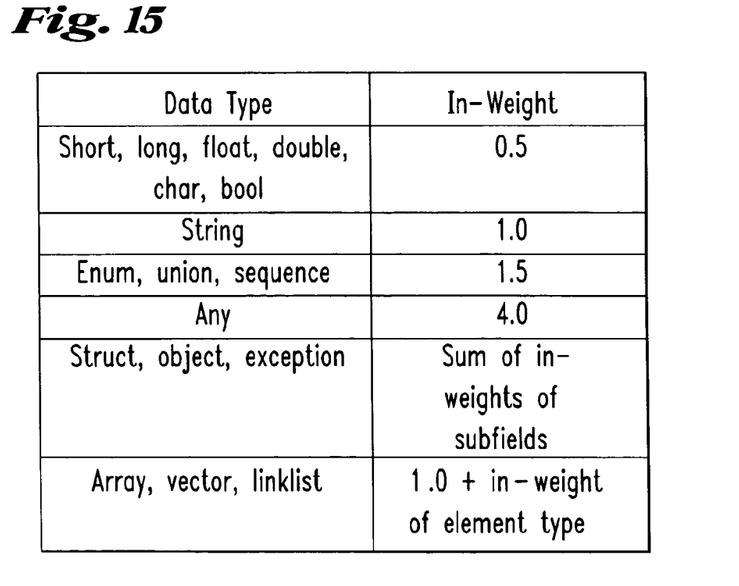
FIG. 15. shows a table assigning a weight to each message field.

Preferably, the present invention assigns a weight for each message field according to the table shown in FIG. 15.

In the preferred embodiment, for data distributing complexity, the System Interface Complexity Weight (SICW) is affected by the following factors ($C_i$):

| | | |
|---|---|---|
| 1: Data format limit | 2: Concurrent access | 3: Synchronous/ |
| 4: Security request | 5: Local/Intranet/Internet | Asynchronous |
| 7: Fault tolerance | access | 6: Performance |
| 10: On-line transaction | 8: Configuration ease | constraint |
| 13: Analysis/testing | 11: Heterogeneity | 9: Reusability request |
| ease | 14. Stability | 12: Installation ease |
| | | 15. Data volume |

$$SICW = \left(\sum_{i=1}^{N_c} C_i\right) / N_c$$ Equation 9 where $N_C$ is the number of factors, $1 <= C_i <= C_m$

In the preferred embodiment, the present invention includes the following basic counting rules:

a) In one subsystem, messages with the same signatures are counted only once.
b) Persistence storage is accounted for in SIICM because it is mostly for intra-subsystem communications.
c) GUI complexity includes the complexity of its interface (add in SIBCM), of the functional-requirement logic (add in SBDLCM), and of the development environment (considered in SICW). The system test complexity for GUI also includes the STDLCM. There are three alternative approaches to obtain a comprehensive metric for interface complexity:
(i) Calculate the SICW as the VAF in Function Point:

$$VAF = 0.65 + 0.01 \times \sum_{i=1}^{14} C_i$$ Equation 10

The ratio of maximum VAF to minimum VAF is limited to 2.08. But it appears to be impossible to apply this metric to all software systems. For example, how can the complexity ratio of the Mars Pathfinder control system to a library book retrieval system be 2.08 to 1? Similarly, how can a system developed today be at most 2.08 times more complex than a system developed twenty years ago? Moreover, the VAF in FD=FC*VAF is so important that it causes many arguments in the accounting process.
(ii) Divide the interface messages into different categories, then multiply the basic count of this category by the complexity weight of the category (Eq. 9).
(iii) Leave SIBCM and SICW separated. The SICW metric can measure the complexity of system analysis, development, test, and maintenance, while the SIBCM metric can measure the I/O productivity and the effort of I/O related assignments.

The present invention includes alternatives (ii) and (iii). Preferably, in Equation 9, the upper boundary $C_m$ of $C_i$ is defined by the OMG organization. Different software system have different ranges. $N_c$ for the number of $C_i(s)$ is extended for the complexity of new technologies.

The present invention further includes an enhanced CASE tool that generates the SIBCM. Thus, once the documents are well established, the metric is readily available. It is performed after each upgrade or release.

In the preferred embodiment, the enhanced CASE tool also computes the SICW. Preferably, the SICW is also assessed jointly by people inside and outside the project team. The present invention includes Overall Software System Product/Process (PP) Complexity.

Software System PP Complexity={Interface complexity, Logical complexity}

Interface Complexity={SEICM (intra-system), SIICM (intra-subsystem)} measured in {SIBCM, SICW}

Logical complexity={SBDLCM-YPath* or SBDLCM-Mc}* should mutually exclusive execution paths be excluded The present invention includes Software system PP metrics for each development stage:

For system analysis complexity: {SEICM, SBDLCM-Mc, SIICM}

For system design/implementation complexity: {SEICM, MLSCM, SIICM}

For system test complexity: {SEICM, STDLCM-path*}* should mutually exclusive conditions be excluded The present invention includes Software system development efficiency metrics:

Implementation-Efficiency metric: SBDLCM-Mc/MLSCM

If Number of Designed System Test Cases is NDSTC, then Implementation-Efficiency is defined as:

System Test-Efficiency: STDLCM-path/NDSTC* *one system test case is defined the same as one use-case Confidence level of NDSTC: Q  Q is related to the test cases coverage rate, assessed by the project team.

The present invention always applies these relations:

Implementation-Efficiency<1<Test-Efficiency $$STDLCM < SBDLCM < \text{ImplementationLogicComplexity}$$

The present invention further includes the System Release Confidence Level. If the frequency of these test cases appearing in the production field have the values specified in the following table:

| Frequency happened in user field | Number of designed test cases | Number of designed cases tested |
|---|---|---|
| f1 % | N1 | n1 |
| f2 % | N2 | n2 |
| . | . | . |
| . | . | . |
| Fi % | Ni | ni |
| . | . | . |
| . | . | . |
| Fm % | Nm | nm |

System test cases occurrence rate in user field.
The System Release Confidence Level (SRCL) is:

$$SRCL = Q \times \frac{\sum_{i=1}^{m}(n_i \times f_i)}{\sum_{i=1}^{m}(N_i \times f_i)} \quad \text{Equation 11}$$

where m is the number of groups of designed cases; fi is the occurrence rate of test cases in group I; $N_i$ is number of designed test cases in group i; $n_i$ is number of test cases performed in group I; and Q is the confidence level of the test case set.

This suite of metrics of the present invention measures what the software industry is most concerned about. It is strictly related to the software quality assurance—V&V (validation and verification).

SEICM measures the complexity of validating whether the system produces the correct output under the given input.

SBDLCM or STDLCM measure the complexity of verifying whether the system can cover all the use-case scenarios and transitions with its design in each use-case.

SIICM measures the increasing complexity in software development brought by new technologies.

The suite of metrics of the present invention has advantages over the traditional complexity metrics:

It measures the complexity of decision statements and I/O-related assignment statements. It measures internal efforts as well as external, visible efforts.

The logical-complexity metric is not based on coding. Instead, it is based on the system functional requirement. It is objective and not design/implementation-dependent.

Preferably, the present invention generates these metrics with an enhanced CASE tool. Data collection for the current metrics is both time-consuming and uninteresting to the developer. The data collected are unreliable. They are often collected only once a year or after the project is over. Metrics generated by the enhanced CASE tool of the present invention are more reliable than FP or MLSCM to the project team. Preferably, the measurement is performed at each release and the progress is quantitatively compared.

These metrics of the present invention encourage detailed and accurate analysis, design, and test documents. They help product maintenance. The most important documents for use-case development include the Class Diagram, Scenario Diagram and State Diagram. These metrics are based on the Scenario Diagram and the State Diagram and are closely related to the Class Diagram.

The metrics of the present invention are constrained by objective factors:

Analysis of the present invention documents are approved by users before accounting for SBDLCM. Missing documents lose credit. Redundant documents are rejected. The metrics of the present invention are superior to MLSCM where non-developers do not know which part of the code should not be counted. Design/Implementation metric MLSCM is measured based on Sablime-controlled code (Sablime is a software version control system, developed by AT&T Bell Labs, now renamed Lucent Technologies). The dead code in Sablime skews the result of MLSCM. If the dead code is not removed, it affects the Implementation-Efficiency metric.

State Transition Diagram Logic Complexity Metric (STDLCM) depends on a thorough analysis of the use-cases and implementation scenarios. If $C_{k,i,j}$ is too high, it will affect the confidence level Q of designed system test cases; if it is too low, it will affect system-test quality. They have to be objective.

These metrics of the present invention encourage higher productivity. Developers are encouraged to improve design efficiency and the testers are motivated and guided to improve test quality and efficiency.

Figure 16:
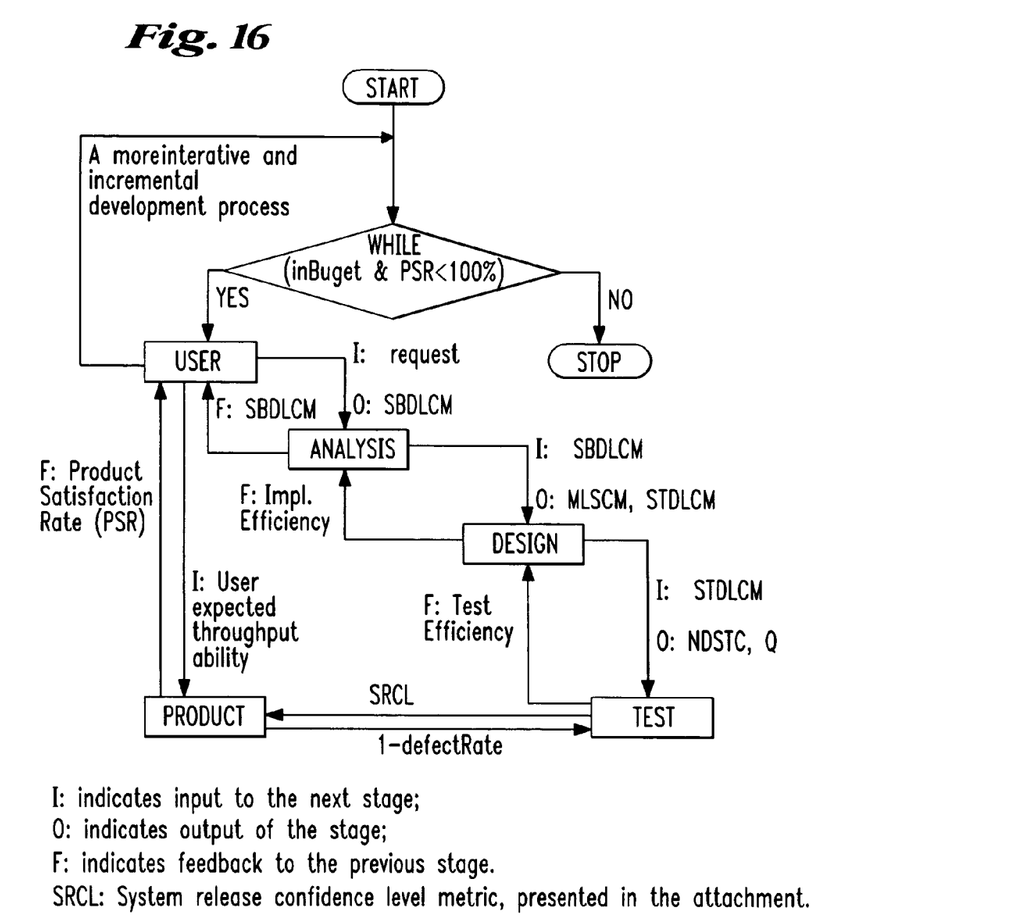
FIG. 16. illustrates a suite of metrics for the software development life cycle.

The present invention includes a suite of metrics for the software development life cycle as illustrated in FIG. 16. Preferably, for each stage of the software system development, there is an input/output metric, and a feedback metric to its previous stage.

The suite of metrics of the present invention is also applicable to software systems that are not developed in Object Oriented Design or with use-cases. Objects/classes in scenario diagrams may be replaced by data entities; the object methods may be replaced by operations on the data entities. SBDLCM measures the logical complexity of process flow of the requirement document. STDLCM measures the system-test complexity based on the proper breakpoints in the software system.

The present invention visualizes software in three levels. The first level is the Scenario Branch Diagram where one can visualize the process branches and their activating and deactivating nodes. The second level is the Scenario diagram where one can pick any edge in the scenario branch diagram and see the whole scenario diagram of this basic process path. In this process path, one can see the number of objects/classes/data entities involved, the number of methods called, and method complexity levels. The third level is the flow diagram of each method. If one method has high complexity, one can pick it in the scenario diagram and see its process flow diagram.

The next breakthrough for software development is the "direct transform." Automatic programming would become feasible only when the software has a proper, unambiguous and accurate "blueprint." The three levels of software visualization of the present invention will help this vision to come true.

While the above invention has been described with reference to certain preferred embodiments, the scope of the present invention is not limited to these embodiments. One skill in the art may find variations of these preferred embodiments which, nevertheless, fall within the spirit of the present invention, whose scope is defined by the claims set forth below.

What is claimed is:

1. A computer-implemented method for measuring a complexity of nested object state transition diagrams that are represented as data structures in the computer, the method comprising:
   a) using the computer, determining a plurality of graphs of object state transitions at K levels $l_k$, wherein:
      (A) $0<k<K$;
      (B) one or more of said graphs at level $l_k+1$ are expansions of one or more of said graphs at level $l_k$; and
      (C) said graphs comprise a plurality of nodes to represent a corresponding plurality of states of use-cases and a plurality of edges to represent a corresponding plurality of transitions between the states; and
   b) using the computer, determining a complexity for said plurality of graphs.

2. The computer-implemented method of claim 1, wherein:
   the state of an object at level k is a super state of an object state at level k+1, and
   the state of an object at level k is a sub state of an object state at level k−1, and
   the method further includes identifying the state transion relationship between super state and sub state as one of a group consisting of "in," "out," and "inout".

3. The computer-implemented method of claim 2, further comprising:

selecting said level $l_k=l_K$;
expanding a graph L from said selected level $l_k$ with at least one graph from said level $l_{K+1}$;
determining paths in said expanded graph; and
determining a number of conditions in said transition paths.

4. The computer-implemented method of claim 3 further comprising:
removing an unnecessary path from said at least one graph.

5. The computer-implemented method of claim 4 wherein said one or more unnecessary paths comprise one or more numbers of a group consisting of:
(exception→fallout),
(exception→exception),
(one-repetition loop→fallout),
(one repetition loop→cancelled), and
(one repetition loop→exception).

6. A computer-implemented method for measuring a complexity of nested object state transition diagrams that are represented as data structures in the computer, the complexity measuring method comprising:
   a) using the computer, determining a plurality of graphs of object state transitions at K levels $l_k$, wherein:
      (A) $0<k<K$;
      (B) one or more of said graphs at level $l_k+1$ are expansions of one or more of said graphs at level $l_k$; and
      (C) said graphs comprise a plurality of nodes to represent a corresponding plurality of states of use-cases and a plurality of edges to represent a corresponding plurality of transitions between the states; and
   b) using the computer, determining a complexity for said plurality of graphs, the complexity determining step including measuring a nested object state transition complexity between two super-states by recursively applying Equation 6:

$$STPC_{k,p,q} = \sum_{i=1}^{m_k}\left(\prod_{j=1}^{n_{k,i}}(C_{k,i,j}+(STPC_{k+1,i,j}-sub_{k,i,j}))+mul_{k,i}(N)\right) \quad \text{Equation 6}$$

wherein:
  $m_k$=a number of transition paths of level-k object (k>1) between two super-states or a number of transition paths of level-1 object;
  $n_{k,i}$=a number of states along path i for level-k object;
  $C_{k,i,j}$ is a number of conditions to bring level-k object state from Sk,i,j−1 to Sk,i,j;
  $STPC_{k+1,i,j}$=Substate Transition Complexity between state Sk,i,j−1 and Sk,i,j;
  $sub_{k,i,j}=0$ if $STPC_{k+1,i,j}=0$ and $sub_{k,i,j}=1$ if ($STPC_{k+1,i,j}\neq 0$);
  if a multiplicity between level-k object and level-$(k+1)$ is 1:N, then $mul_{k,i}(N)=0$ if (N=1) and $mul_{k,i}(N)=r$ if (N>1); and
  r is a number of times that level-$_{k+1}$ objects transit back to level-$_k$ in path i.

7. The computer-implemented method of claim 6, wherein:
   the state of an object at level k is a super state of an object state at level k+1, and
   the state of an object at level k is a sub state of an object state at level k−1, and the method further includes identifying the state transion relationship between super state and sub state as one of a group consisting of "in," "out," and "inout".

8. The computer-implemented method of claim 7, further comprising:
    selecting said level $l_k=l_K$;
    expanding a graph L from said selected level $l_k$ with at least one graph from said level $l_{K+1}$;
    determining paths in said expanded graph; and
    determining a number of conditions in said transition paths.

9. The computer-implemented method of claim 8 further comprising:
    removing an unnecessary path from said at least one graph.

10. The computer-implemented method of claim 9 wherein said one or more unnecessary paths comprise one or more numbers of a group consisting of:
    (exception→fallout),
    (exception→exception),
    (one-repetition loop→fallout),
    (one repetition loop→cancelled), and
    (one repetition loop→exception).

* * * * *